April 19, 1966  H. E. JURGENS  3,246,911
TANDEM AXLE SUSPENSION
Filed Dec. 16, 1963  2 Sheets-Sheet 2
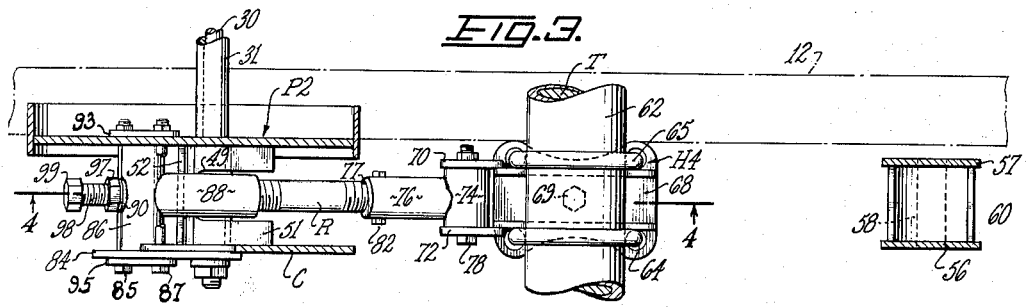
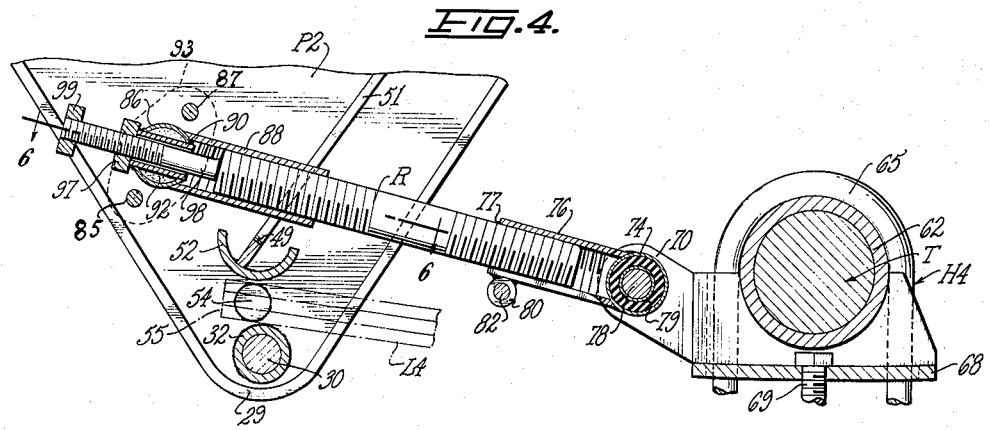
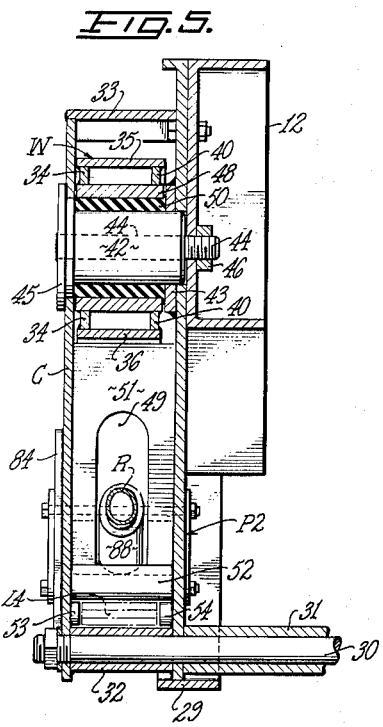
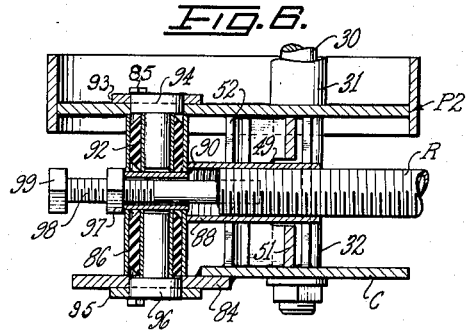
INVENTOR.
*HERMAN E. JURGENS*
BY
*Howard L. Johnson*
ATTORNEY

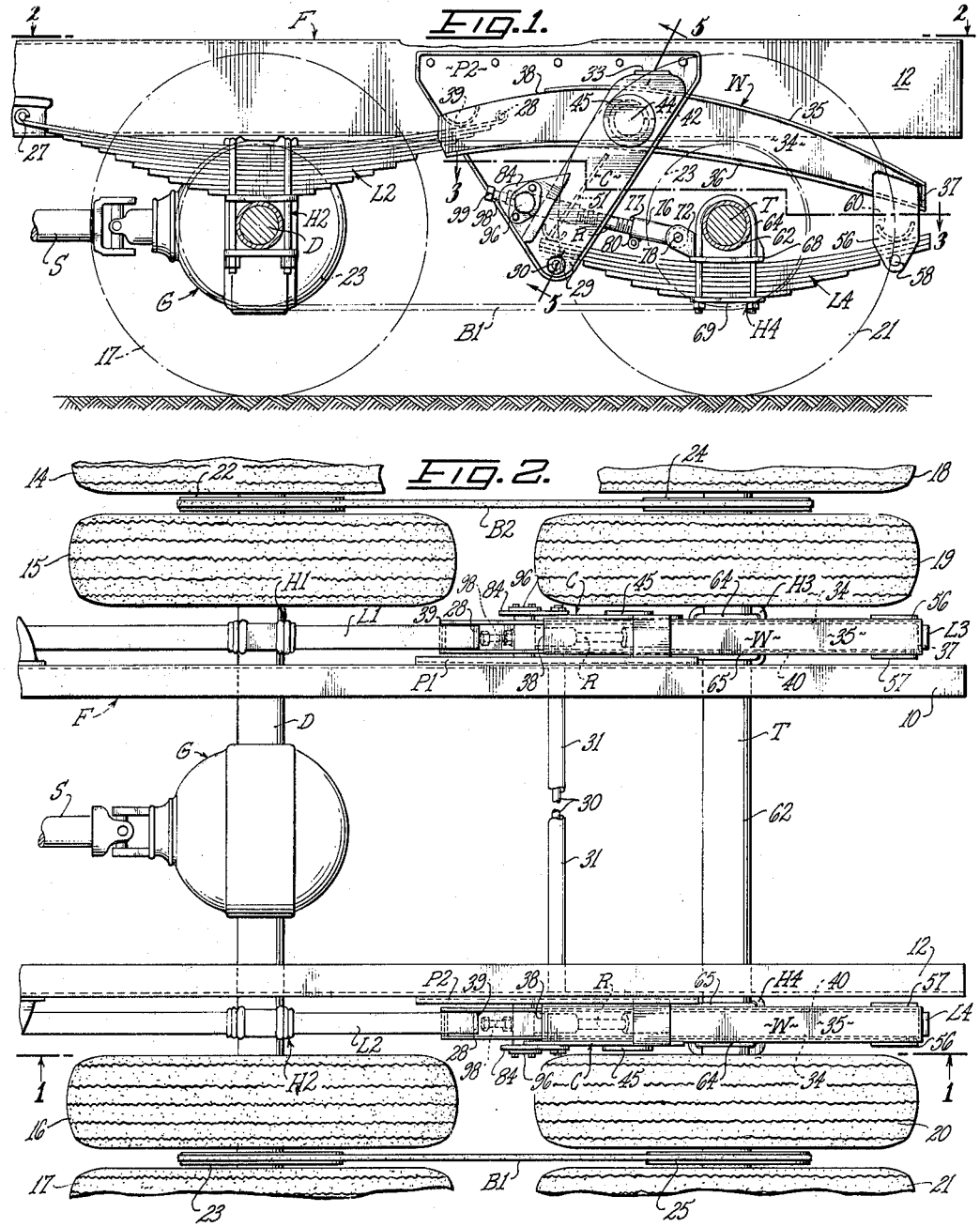

United States Patent Office 3,246,911
Patented Apr. 19, 1966

3,246,911
TANDEM AXLE SUSPENSION
Herman E. Jurgens, 421 Banning Ave., Compton, Calif.
Filed Dec. 16, 1963, Ser. No. 330,667
5 Claims. (Cl. 280—104.5)

In automotive vehicles such as large, highway trucks or tractors, which are designed to carry heavy cargo, artillery pieces, etc., the undercarriage at one end may include dual or tandem axles, often each carrying dual wheels. Only one axle of the pair is driven by the engine, and the other axle is a free or trailing axle. Certain problems arise from this arrangement, such as keeping adjacent wheels of the two axles in longitudinal alignment, as well as keeping taut the endless belt connection between the two axles. Such connection serves to distribute the initial driving torque from the engine; since the designed weight distribution between the two axles is based on the continuance of such equalized vehicle support, the disturbance of this equilibrium (if long continued) may cause and accentuate other aspects of unbalance and seriously affect the overall operating efficiency. The trailing axle is often spaced adjustably from the drive axle, and its particular location is varied by the means of a radius rod at each side of the vehicle; however this has been difficult to adjust because of its construction and location. By the present improved construction and mounting of such radius rod however, it can be manipulated by a person standing alongside the vehicle from a position at which he can visually check the changing alignment of the wheels at the same time.

Carrying of such heavy loads virtually compels the use of power brakes on both of the dual axles (as well as on the third axle). However such braking torque, when concentrated along a comparatively short length of the vehicle, can simultaneously vibrate the vehicle if not effectively balanced. By the present construction, the component of such brake torque from the first axle is directed opposingly to the corresponding component from the second axle, thereby substantially canceling the potential transference of these components to the vehicle proper. Additionally the present construction permits greater vertical play to the rear axle (useful in backing across ditches and curbs) which might otherwise be attainable only by its further separation from the first axle (if at all).

These and other advantages will appear from the following illustrative description of a presently preferred form of my invention, wherein:

FIGURE 1 is a side elevational view of my dual axle assembly carrying tandem wheels, attached to the underframe of a highway vehicle (not shown) as viewed along the line 1—1 of FIG. 2;

FIGURE 2 is a top plan view of the assembly as seen along the lines 2—2 of FIG. 1;

FIGURE 3 is a stepped, horizontal sectional view taken through a portion of the assembly along the line 3—3 of FIG. 1, particularly showing the construction of the radius bar and associated structures;

FIGURE 4 is a vertical axial section taken through the radius bar and connected structures as viewed along the line 4—4 of FIG. 3, on a larger scale than the previous view;

FIGURE 5 is a transverse sectional view taken along the line 5—5 of FIGURE 1; and FIGURE 6 is a sectional view along the line 6—6 of FIG. 4, particularly showing the free end of the radius bar, by manipulation of which the tandem wheels may be aligned relative to one another, and slack in the transmission belts may be taken up by displacing the trailing axle relative to the driving axle.

The invention is here associated with a generally rectangular, horizontally disposed frame F, comprising longitudinal, parallel, inturned channel members 10, 12, which frame forms part of the chassis of an automobile (not otherwise shown). One end of the frame is supported by a tandem pair of wheel assemblies, each of which carries two pair of dual wheels 14–15, 16–17, 18–19, 20–21. The drive axle D carries the drive wheels 14–15 and 16–17, and is connected through the differential gear assembly G and drive shaft S to a prime mover or motor (not shown). A trailing axle T carries two pair of dual wheels 18–19, 20–21 which are longitudinally aligned with the corresponding wheels of the adjacent drive axle.

In order to transmit driving torque to the other axle T, each of the two axles carry a pair of pulley 22, 23, 24, 25 mounted between the respective dual wheels, and connected by a generally horizontal drive belt B1, B2, which may be formed for example of chain or heavy fabric; or it may embody a sprocket drive. Due to vibration from continued road operation, as well as from general wear and aging, the tautness of such endless belts B1, B2 may be lessened and their functional effectiveness accordingly impaired. Such alignment must be checked periodically and any misalignment or slack corrected as soon as observed. Even so, a driver may observe in the midst of a trip that the wheel(s) on one end of a tandem axle is spinning because most of the power is being transmitted to the road by the corresponding wheel(s) of the adjacent axle. Such condition should be corrected at once, both to prevent excess wear of the one set of tires as well as to relieve the consequent strain on connecting structures. Previously an operator had to effect such adjustment from an uncomfortable position beneath the vehicle, where additionally it was impossible to visually check the resulting wheel alignment. By the present construction, however, both can be quickly and easily accomplished by an operator standing alongside the truck; hence he need no longer hesitate to try to adjust such misalignment when he suddenly discovers it at a location remote from protected parking and repair facilities. In most instances the same adjustment which tightens the belt will align the wheels, since such adjustment is effected by displacing one of the tandem axles toward or away from (the corresponding end of) the adjacent axle. For convenience the two axles will be referred to herein as the first axle (D) and the second axle (T); usually the first axle is the driving axle, but in some vehicles the driving axle may be the second axle.

The drive axle D is attached to the frame F in a conventional manner, being suspended between hanger assemblies H1, H2, each centrally dependent from a leaf spring assembly L1, L2, each of which latter is terminally secured to the parallel frame member 10 or 12, at the horizontal studs 27. The opposite end 28 however, is free-floating as explained subsequently. Disposed longitudinally posterior to each leaf spring assembly L1, L2 is a triangular, vertically disposed, hanger plate P1, P2 bolted or otherwise securely fastened to the outer face of the respective frame member 10 or 12. The downward directed point 29 of the pair of generally equilateral triangles (hanger plates) are bolted together by a cross shaft 30. The central span of the shaft 30, which thus transversely underlies the vehicle frame F, carries a tubular spacer 31, the opposite ends of which thus abut the adjacent faces of the hanger plates (FIGS. 2 and 5).

Spaced laterally outward from each hanger plate is a smaller, cover plate or facing plate C (FIG. 5) with its top margin cross-braced by the wall 33 and its lower end traversed by the cross shaft 30, the latter bearing an outer, tubular spacer 32 having its opposite ends welded respectively to the hanger plate P2 and to the cover plate C. Between these two, horizontally separated plates P and C, is mounted a walking beam W formed by parallel side walls 34, 40 and curved top 35 and bottom 36 walls, connected by an upright end-wall 37; the enclosure thus formed is open upwardly at 38 and forwardly carries an arcuate or downwardly concave, transverse wall 39 which provides an upper abutment for the proximate end of the spring L1 or L2.

The longitudinal walking beam W, which is thus sandwiched between the two vertical plates P and C but with a clearance from each, is mounted for limited movement on a horizontally disposed, cylindrical hub 42 (FIG. 5) which traverses both plates as well as an anchoring disk 43, and is itself axially traversed by a stub axle 44 outwardly bearing a stepped head 45, the outermost, flanged portion of which overlies the cover plate C, and having its inner end fastened to the vehicle frame 12, as by a nut 46. The beam W is formed with an outer journal housing 48 spacedly surrounding the hub 42, with an intermediate, cylindrical bearing 50, such as Teflon, disposed therebetween. Spaced beneath the walking beam W is a transverse, angularly descending, cross wall 51, terminating within the bowed curvature of an arcuate, spring seat 52 disposed for sliding abutment of the end of the spring assembly L3 or L4. The bracket wall 51 is formed with an elongated portal or opening 49 (FIG. 5) through which an upwardly directed, radius rod R extends without making lateral contact.

The two leaf-spring assemblies L3, L4 which support the trailing axle T, at their forward end and are slidably retained between the dependent spacer 32 (FIG. 5) and the overlying, arcuate, slide abutment 52, being laterally positioned between the opposing studs 53, 54. At the rear of the beam, a parallel pair of hanger plates 56, 57 (FIG. 3) depend from the side walls 34, 40, and are terminally connected by a cross stud 58 and by an arcuate shaped, slide abutment 60 spaced thereabove. The rear end of each spring assembly L3, L4 is thus slidably and pivotally retained between the stud 58 underneath and the abutment 60 above; that is, like its forward end (between 32 and 52) it is capable of limited longitudinal sliding adjustment, and is also pivoted at such end in response to vertical oscillation of its central portion by the U-bolts 64, 65. Lengthwise shift may occur as a result of horizontal moving of the axle T by the radius rod R, or by application of breaking torque to the axle T (which torque is transmitted to the spring assemblies L3, L4).

The second or adjustable axle T is supported in a longitudinal trunnion tube 62 which is spanned by an adjacent pair of U-bolts 64, 65 of a leaf-spring hanger assembly H3, H4. The spring assembly itself (L3 or L4) is bolted to a cradle-like casting 68 by an anchor pin 69. Extending forward from the cradle are a spaced pair of vertically directed arms 70, 72 which journal the transversely cylindrical head 74 of a radially projecting, partially split, closed-bottom, socket tube 76 which tube is internally threaded inward from its open end 77. The head 74 has a limited rotation about an axial stud 78 which traverses a cylindrical bearing 79 located within the head 74, and extends outward beyond each supporting arm 70, 72. The split end 77 of the socket 76 is also formed with a dependent pair of juxtaposed ears 80 which are jointly traversed by a tightening screw 82, by means of which the split end can be clamped together against the ends of a rod R (threadedly) inserted and thus locked therein.

An extension plate 84 projects forward from the lower margin of the cover plate C, generally parallel to the hanger plate P; and a transverse tube 86 (FIG. 6) extends between the two plates which are bolted together at 85, 87. Extending perpendicularly from the center of the cross tube 86, is an open-ended, radius tube 88 which is internally threaded and aligned with a diametric aperture of the cross tube 86, which aperture accordingly bisects the length of the tube 86. A smooth conduit 90 is disposed along such aperture in line with the radius tube 88, all three tubes (86, 88, 90) being fixedly fastened together as by welding. A pair of transversely aligned, inwardly facing studs 94, 96 which are integral with the outer bolt plates 93, 95 are mounted within the cross tube 86 (on opposite sides of the conduit 90) so as to form a fixed axis for (limited) rotation of the tri-tube unit (86, 88, 90), the axially separated studs being surrounded by a generally cylindrical bushing 92. An elongated, radius rod R which is oppositely threaded (i.e., right and left threads respectively) adjacent its respective ends, has the threaded lengths mounted respectively into the socket tube 76 and extending through the radius tube 88 with its free end projecting therebeyond. Such outer end is formed by a stem 98 of smaller diameter which freely traverses the conduit 90 and is outwardly threaded to carry a lock-nut 97 (which thus can be tightened against the end of the conduit 90). Terminally the stem has a peripherally enlarged or flanged head 99, having a polygonal rim so that it can be readily engaged for manipulation by a hand tool such as a wrench (not shown).

Accordingly it will be seen that turning the "hexhead" 99 rotates the radius rod R in one direction or the other, and the socket tube 76 and radius tube 88 will be mutually brought together or separated axially along the rod R. The trailing axle T will be correspondingly displaced from or drawn toward the driving axle D, thereby also tightening or loosening the endless transmission belt B1 or B2. At the same time, the proximate end 55 of the rear leaf-spring assembly L3 or L4 will move lengthwise a small amount in its sliding seat between the supporting spacer 32 and the overhanging abutment arc 52; this tilts upward the rear end of the beam W and causes the forward end (at 39) to bear down. Since the walking beam is a lever in this connection, the down pressure exerted at 39 can be varied also by the initial location of the intermediate pivot point 44 along its length.

It will be observed however that the second axle T must be located vertically between the walking beam W and the rear spring assembly L3, L4. Preferably the first axle D is carried beneath the front spring assembly L1, L2. Thus as viewed in FIG. 1, both wheels and axles are rotating counterclockwise, and when this directional force or torque is simultaneously braked on both wheels, and the component from each is brought together at the spring seat 39, the two components are there oriented opposingly so as to cancel each other to a marked extent. Obviously the neutralizing of these components prevents their transmission to the vehicle frame in the form of harmful vibration.

It is important to observe also that each radius rod R acts as a coupling arm in pivotally attaching the second wheel and its associated structure to the frame (by the bracket means centered at 94, 96). The rear unit of the tandem axle is thus frame-attached at two pivot points or axes 44 and 94–96; this permits the longitudinal adjustment of the second leaf-spring assembly relative to the first leaf-spring assembly at the same time that the rear axle is shifted lengthwise to the vehicle frame. The walking beam however remains suspended from its permanent axis 44 and its consequent self-alignment changes the amount of pressure or leverage which it exerts on the front spring assembly L1 or L2 at 39. The front unit of the tandem is frame-connected only at the fixed point 27, while its connection to the rear unit (at 39) is both a longitudinal sliding engagement and a pivot point for vertical flexing of the leaf springs L1, L2 (and for the rocking of the forward arm of the walking beam). The result is quite different from that produced by suspending the second unit solely from the pivot attachment of the walking beam (44); or from mounting both axles along the same (vertical) side of the respective springs; or from making the two units independently adjustable, as by a separate radius rod to the end of each axle rather than having the two end-to-end spring assemblies and the walking beam coupled together longitudinally as here shown. Finally, the present construction affords greater vertical play to the rear axle of the tandem, which is especially useful in backing the rig over obstacles, since conforming to such abrupt deviations of the roadway (either above or below the horizontal) produces a compensating tensioning of the front spring suspension. This is of course independent of the application of torque by the brakes.

It will be obvious to those skilled in the art that various changes and modifications of construction and operation may be made wtihout departing from the inventive concept and therefor this disclosure is not to be limited by the precise details shown in the drawings or particularly described in the specification by way of example.

I claim:

1. The combination comprising:
    a frame including an elongated support member;
    a generally parallel pair of axles functionally disposed transversely to said support member for simultaneous rotation in the same direction, both of said axles being adapted to have braking torque applied simultaneously thereto;
    a pair of leaf-spring assemblies extending generally lengthwise in succession along said support member with one assembly vertically and longitudinally spaced from the longitudinal axis of the other, each assembly connecting one of said axles to said frame;
    a walking beam pivotally secured intermediate its length to said frame at a common level to the most distant frame-attachment level of one of said leaf-spring assemblies, and disposed lengthwise to and vertically spaced from the other leaf-spring assembly, the axle of the latter thus being located between said assembly and said walking beam and at a similar level at that of the other axle, the length of said walking beam being greater than said displaced leaf-spring assembly, the outer end of said beam being pivotally coupled to the outer end of the displaced leaf-spring assembly, and the inner end of said assembly being pivotally supported by the frame, the inner end of the beam being disposed supportingly in longitudinal sliding registration with the inner end of the other leaf-spring assembly at substantially the same level as the pivot point of the walking beam, whereby braking torque simultaneously transmitted from both rotating axles to their respective leaf-spring assemblies, will be balanced by pressure of said inner end of the beam exerted against the oppositely sliding force of the inner end of the supported leaf-spring assembly.

2. The combination of the preceding claim 1 which additionally includes adjustable means for selectively locating the two parallel axles toward and away from each other, and also includes drive means for transmitting rotational drive force from one axle to the other.

3. The combination of the preceding claims wherein said adjustable means for selectively locating the two parallel axles toward and away from each other comprise:
    a generally parallel pair of walls fixedly secured to said frame and spaced apart face to face;
    a pair of internally threaded, longitudinally aligned socket members, each mounted for limited pivotal movement on a transverse axis, which axes are generally parallel to each other, one of said socket members being an open-ended tube;
    an externally threaded radius rod formed with right and left threads adjacent its respective ends, which ends are rotatably disposed in the respective socket members so as to separate and converge said members lengthwise upon rotation of the radius rod, one end of said radius rod projecting through said open-ended, internally threaded socket tube and between said fixed, parallel walls, and being provided with an attachment surface adapted for manipulative adjustment;
    a pair of fixed studs axially extending toward each other from said parallel walls and disposed jointly to form a transverse pivotal axis for the tubular socket member, with the mutually facing, inner ends of said studs being spaced apart to permit longitudinal movement of the radius rod freely therebetween; and
    a transverse tube rotatably disposed about said axially aligned studs between said parallel walls and fixedly secured to an end of said tubular socket member, the transverse tube being diametrically apertured in line with the tubular socket member, a projecting length of the radius rod being extended through said diametric aperture and being disposed intermediate the separated ends of said studs, the radius rod having lock means adapted to anchor it to selected longitudinal positions within the pair of socket members.

4. For combination with a frame of a wheeled vehicle and the like: a trunnion tube adapted to carry a wheel-bearing axle, which axle extends lengthwise therethrough;
    a hanger unit fixedly carried by said tube and adapted to retain a spring assembly for support of the tube and axle relative to said frame;
    a pair of internally threaded, longitudinally aligned, socket members, each mounted for limited pivotal movement on a transverse axis, which axes are generally parallel to said axle, one socket member being connected to said hanger unit and the other socket member being connected to said vehicle frame, one of said socket members being an open-ended tube;
    an externally threaded radius rod formed with right and left threads adjacent its respective ends, which ends are rotatably disposed in the respective socket members so as to separate and converge said members lengthwise upon rotation of the radius rod, and thereby to adjustably position the trunnion tube and axle relative to the vehicle frame, one end of said radius rod projecting through said open-ended, internally threaded socket tube and being provided with an attachment surface adapted for manipulative adjustment, said radius rod being disposed between a generally parallel pair of walls spaced laterally therefrom and secured to the vehicle frame;
    a pair of fixed studs axially extending toward each other from said parallel walls and disposed jointly to form a transverse pivotal axis for the tubular socket member, with the mutually facing, inner ends of said studs being spaced apart to permit longitudinal movement of the radius rod freely therebetween; and
    a transverse tube rotatably disposed about said axially aligned studs and fixedly secured to an end of said tubular socket member, the transverse tube being diametrically apertured in line with the tubular socket member, a projecting length of the radius rod being extended through said diametric aperture and being disposed intermediate the separated ends of said studs, said projecting length of the radius rod being separately threaded (independent of the right and left threads), and lock nut means mounted on said separate threads and disposed to abut against said transverse tube and thereby to anchor the radius rod at its selected position within the pair of socket members.

5. A radius rod assembly, comprising in combination:
    a generally parallel pair of walls fixedly spaced apart face-to-face;
    a pair of internally threaded, longitudinally aligned, socket members, each mounted for limited pivotal movement on a transverse axis, which axes are generally parallel to each other, one of said socket members being an open-ended tube;

an externally threaded radius rod formed with right and left threads adjacent its respective ends, which ends are rotatably disposed in the respective socket members so as to separate and converge said members lengthwise upon rotation of the radius rod, one end of said radius rod projecting through said open-ended, internally threaded socket tube and between said fixed, parallel walls and being provided with an attachment surface for manipulative adjustment;

a pair of fixed studs axially extending toward each other from said parallel walls and disposed to jointly form a transverse pivotal axis for the tubular socket member, with the mutually facing, inner ends of said studs being spaced apart, to permit longitudinal movement of the radius rod freely therebetween;

a transverse tube rotatably disposed about said axially aligned studs between said parallel walls and fixedly secured to an end of said tubular socket member, the transverse tube being diametrically apertured in line with the tubular socket member, a projecting length of the radius rod being extended through said diametric aperture and being disposed intermediate the separated ends of said studs, the radius rod having lock means adapted to anchor it at longitudinally selected positions within the pair of socket members.

References Cited by the Examiner
UNITED STATES PATENTS

| | | | |
|---|---|---|---|
| 2,639,166 | 1/1950 | Jones | 280—104.5 |
| 3,034,592 | 5/1962 | Butler | 280—104.5 |

FOREIGN PATENTS 399,951  10/1933  Great Britain.

BENJAMIN HERSH, *Primary Examiner.*